United States Patent
Kuo et al.

(10) Patent No.: US 8,947,620 B2
(45) Date of Patent: Feb. 3, 2015

(54) BROADBAND CHOLESTERIC LIQUID CRYSTAL FILM, METHOD FOR FABRICATING THE SAME, POLARIZATION DEVICE, AND HIGH LIGHT EFFICIENCY LIQUID CRYSTAL DISPLAY EMPLOYING THE SAME

(75) Inventors: Hui-Lung Kuo, Taipei (TW); Mei-Chih Peng, Taoyuan County (TW); Yi-Ping Hsieh, Changhua County (TW); Chin-Kai Chang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 244 days.

(21) Appl. No.: 13/284,163

(22) Filed: Oct. 28, 2011

(65) Prior Publication Data
US 2012/0169960 A1  Jul. 5, 2012

(30) Foreign Application Priority Data
Dec. 29, 2010  (TW) .............................. 99146534 A

(51) Int. Cl.
| | | |
|---|---|---|
| *G02F 1/1335* | (2006.01) | |
| *C09K 19/02* | (2006.01) | |
| *B29D 11/00* | (2006.01) | |
| *G02B 5/30* | (2006.01) | |
| *G02F 1/1347* | (2006.01) | |
| *G02F 1/137* | (2006.01) | |

(52) U.S. Cl.
CPC .......... *C09K 19/02* (2013.01); *B29D 11/00644* (2013.01); *G02B 5/3016* (2013.01); *B29D 11/00788* (2013.01); *G02F 1/1347* (2013.01); *G02F 1/13718* (2013.01); *G02F 2202/022* (2013.01); *G02F 2202/40* (2013.01)
USPC ................ 349/115; 349/61; 349/96; 349/175

(58) Field of Classification Search
None
See application file for complete search history.

(56) References Cited

U.S. PATENT DOCUMENTS

| | | | |
|---|---|---|---|
| 5,506,704 A | 4/1996 | Broer et al. | |
| 5,691,789 A | 11/1997 | Li et al. | |
| 5,808,713 A * | 9/1998 | Broer et al. | 349/98 |

(Continued)

FOREIGN PATENT DOCUMENTS

| | | |
|---|---|---|
| CN | 1285954 | 11/2006 |
| EP | 0875525 A1 | 11/1998 |

(Continued)

OTHER PUBLICATIONS

Taiwan Patent Office, Office Action, Patent Application Serial No. 99146534, Dec. 19, 2013, Taiwan.

*Primary Examiner* — Richard Kim

(57) ABSTRACT

The invention provides a broadband cholesteric liquid crystal film, a method for fabricating the same, a polarization device employing the same, and high light efficiency liquid crystal display employing the same. The cholesteric liquid crystal film is a single-layer liquid crystal material structure, and has a top surface and a bottom surface. Further, the cholesteric liquid crystal film includes a first region, a second region, and a third region, and the first region is adjacent to the top surface of the cholesteric liquid crystal film, the third region is adjacent to the bottom surface of the cholesteric liquid crystal film, and the second region is located between the first and third regions, and the average helical pitch P1 of the first region and the average helical pitch P3 of the third region are both larger than the average helical pitch P2 of the second region.

16 Claims, 4 Drawing Sheets

(56) References Cited

U.S. PATENT DOCUMENTS

| | | | |
|---|---|---|---|
| 6,016,177 A | 1/2000 | Motomura et al. | |
| 6,099,758 A | 8/2000 | Verrall et al. | |
| 6,630,974 B2 * | 10/2003 | Galabova et al. | 349/119 |
| 6,669,999 B2 | 12/2003 | Hsieh et al. | |
| 7,311,952 B2 | 12/2007 | Hanelt | |
| 2011/0063547 A1 * | 3/2011 | Takahashi et al. | 349/98 |

FOREIGN PATENT DOCUMENTS

| | | |
|---|---|---|
| EP | 0881509 A2 | 12/1998 |
| TW | 200808117 | 2/2008 |

* cited by examiner

BROADBAND CHOLESTERIC LIQUID CRYSTAL FILM, METHOD FOR FABRICATING THE SAME, POLARIZATION DEVICE, AND HIGH LIGHT EFFICIENCY LIQUID CRYSTAL DISPLAY EMPLOYING THE SAME

CROSS REFERENCE TO RELATED APPLICATIONS

This application is based upon and claims the benefit of priority from the prior Taiwan Patent Application No. 099146534, filed on Dec. 29, 2010, the entire contents of which are incorporated herein by reference.

BACKGROUND

1. Technical Field

The disclosure relates to a cholesteric liquid crystal film and an article employing the same, and in particular relates to a broadband cholesteric liquid crystal film and an article employing the same.

2. Description of the Related Art

Cholesteric liquid crystal film is quite a unique optical element exhibits selective light reflection and circular dichronism. It is widely applied in various display devices or photoelectric elements, such as polarizer films or backlight modules of LCDs.

Cholesteric liquid crystal owns a layer-by-layer molecular stacking structure. The long axis directions of the molecular layers of the stacked molecular structure are in essence the same, Said molecular directors are twisted a small angle from one layer to another one layer. The helical pitch of a cholesteric liquid crystal is defined as the distance between liquid crystal molecular layers which are located at an angle of 360 degrees to each other along the long axis direction. The stacked molecular structure of a cholesteric liquid crystal layer can be of left-handed orientation or right-handed orientation depending on the chirality of the chiral compounds of the cholesteric liquid crystal. Specifically, a circular polarized light having the same circular dichronism as the cholesteric liquid crystal layer will be reflected, and the other circular polarized light having an opposite circular dichronism will pass through the cholesteric liquid crystal film.

According to the Bragg reflection rule, the relationship between wavelength ($\lambda$) of a cholesteric liquid crystal, an average refraction ratio ($n_{ave}$) of a thin film, and a helical pitch (P) of a cholesteric liquid crystal molecule is:

$$\lambda = n_{ave} \cdot P$$

The reflection bandwidth ($\Delta\lambda$) relates to the birefringence ($\Delta n$) and helical pitch (P) of cholesteric liquid crystal molecules, according to the relationship equation:

$$\Delta\lambda = \Delta n \cdot P$$

According to this formula, the selective reflection bandwidth of common cholesteric liquid crystal is strongly related to its birirefringence ($\Delta n$) and only about several tens of nanometers (such as 40-50 nm). It is only part of range of visible light, which covers bandwidth from 400 to 700 nm. It is thus important to improve the assembly structure of cholesteric liquid crystal molecules to meet the requirements for a wider selective reflection bandwidth.

Since the selective reflection bandwidth of a common single layer of a cholesteric liquid crystal film is limited, a plurality of layers of a cholesteric liquid crystal film are prepared by coating by multiple times such that the bandwidth of each layer can be combined together so as to cover the whole wavelength range of visible light.

For example, U.S. Pat. No. 6,016,177 discloses a multilayer cholesteric liquid crystal film 10 including layers 12, 14, and 16 of cholesteric liquid crystal polymers having different helical pitches, wherein the layers 12, 14, and 16 are combined by adhesive layers 18, as shown in FIG. 1. However, a plurality of manufacturing processes is required and there are multiple alignment interferences at the interfaces which adversely affect the polarizing effect thereof. Furthermore, the manufacturing process of the multilayer cholesteric liquid crystal film 10 is complicated, and the yield is reduced thereof.

In order to solve the aforementioned problems, a method for fabricating a multilayer cholesteric liquid crystal film via continuous coatings is provided. Due to the absence of the adhesive layers, the multilayer cholesteric liquid crystal film exhibits improved light transmittance. The layers of the multilayer cholesteric liquid crystal film, however, have similar surface tensions, which may cause coating defects within the multilayer cholesteric liquid crystal film.

On the other hand, since a single-layer cholesteric liquid crystal film has a simplified manufacturing process and less coating defects resulting from continuous coatings, a single-layer cholesteric liquid crystal film is desired to replace the conventional multilayer cholesteric liquid crystal films.

U.S. Pat. No. 5,506,704 discloses a single-layer cholesteric liquid crystal film. The variation of the helical pitch is achieved via a long-term UV exposure. Thereby, the helical pitch in the thickness direction is varied progressively. However, a the long time UV exposure is needed will be problematic for mass production, especially for low production efficiency, and specialized equipment needed.

U.S. Pat. No. 7,311,952 discloses a liquid crystalline film with broadened reflection bandwidth fabricated via a two-stage polymerization method. First, a coating of a polymerizable liquid-crystalline material is partially polymerized via an actinic radiation in an environment, which has an inhibiting action on the polymerization (such as air or air enriched with oxygen), to form a semi-polymerized structure. After a briefly re-alignment period, the semi-polymerized film is fully polymerized via a high-energy actinic radiation to form a soiled film. Referring to FIG. 2, the obtained cholesteric liquid crystal film 20 can be derived into three regions according to the helical pitch. The region 22 adjacent to the air top surface 21 of the cholesteric liquid crystal film 20 has the shortest helical pitch, the region 24 disposed between the region 22 and the region 26 has the longest helical pitch, and the region 26 has the middle value of the helical pitches in between the region 22 and region 24 does. The method, however, has an inherently high degree of process uncertainty due to the additional alignment time and harsh reaction conditions (such as radiation energy) of the partial polymerization.

SUMMARY

In this article, a newly cholesteric liquid crystal (CLC) helical pitch is proposed, An exemplary embodiment of a broadband cholesteric liquid crystal film is a single-layer liquid crystal material structure and has a top surface and a bottom surface, wherein the broadband cholesteric liquid crystal film consists of a first region, a second region, and a third region. The first region is adjacent to the top surface of the cholesteric liquid crystal film, the third region is adjacent to the bottom surface of the cholesteric liquid crystal film, and the second region is located between the first and third regions. Particularly, the average helical pitch P1 of the first region and the average helical pitch P3 of the third region are both larger than the average helical pitch P2 of the second region.

Further, this disclosure also provides a method for fabricating the aforementioned broadband cholesteric liquid crystal film, including the steps (A)-(D). In step (A), a polymerizable cholesteric liquid crystal composition and a photoinitiator are dissolved in a solvent to prepare a solution for coating. In step (B), the solution is coated onto a substrate (such as a pre-treated alignment substrate), and a cholesteric liquid crystal (CLC) coating layer is obtained. In step (C), the CLC coating layer is heated in a first atmosphere containing a first pre-fixed oxygen concentration, wherein the first pre-fixed oxygen concentration is a fixed value of between 10-30 vol %, preferably 15-25 vol %. In step (D), the heated CLC layer is cured in a second atmosphere containing a second pre-fixed oxygen concentration, obtaining the aforementioned broadband cholesteric liquid crystal film, wherein the second pre-fixed oxygen concentration is a fixed value of between 0.01-10 vol %.

Moreover, the disclosure also provides a polarization device, including the aforementioned broadband cholesteric liquid crystal film; and a retardation film disposed on the broadband cholesteric liquid crystal film.

The retardation film has an in-plane retardation value (Ro) substantially one-quarter of the wavelength of visible light, and an out-of-plane retardation (Rth), wherein the ratio |(Rth/Ro)| is between 0.5-3

According to some embodiments of this disclosure, a high light efficiency liquid crystal display is provided. The high light efficiency liquid crystal display includes a top substrate and a bottom substrate, a first electrode formed on a bottom surface of the top substrate, and a second electrode formed on the top surface of the bottom substrate, wherein a liquid crystal cell is sandwiched between the top substrate and the bottom substrate, and the aforementioned broadband cholesteric liquid crystal film disposed inside or outside of the liquid crystal cell.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The disclosure provides a cholesteric liquid crystal film with a broad reflection bandwidth which is a single-layer liquid crystal material structure and has several regions respectively having different average helical pitches. Particularly, the helical pitches of the several regions have a predetermined magnitude relationship. Further, the broadband cholesteric liquid crystal film of this disclosure can be further combined with a retardation film to constitute a reflection type polarization device, with high contrast, and high transmittance, which is suitable to be applied in polarizers, brightness enhancement devices, or 3D Image display devices.

Broadband Cholesteric Liquid Crystal Film

The term "broadband cholesteric liquid crystal film" means a cholesteric liquid crystal film with a broad selective reflection bandwidth. The broadband cholesteric liquid crystal film of this disclosure has a single-layer cholesteric liquid crystal material coating layer. The term "single-layer cholesteric liquid crystal material" means a cholesteric liquid crystal film prepared by curing a single cholesteric liquid crystal composition (including the composition made of nematic liquid crystal and chiral compound) in the presence of a photoinitiator. The broadband cholesteric liquid crystal film of the disclosure is a single-layer film, thereby eliminating complicated manufacturing processes and coating defects caused when forming a multilayer cholesteric liquid crystal film.

Figure 1:
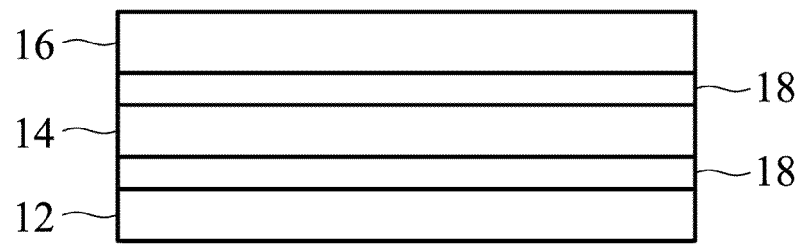
FIG. 1 shows a cross section of a conventional multilayer cholesteric liquid crystal film with adhesive layers.
Figure 2:
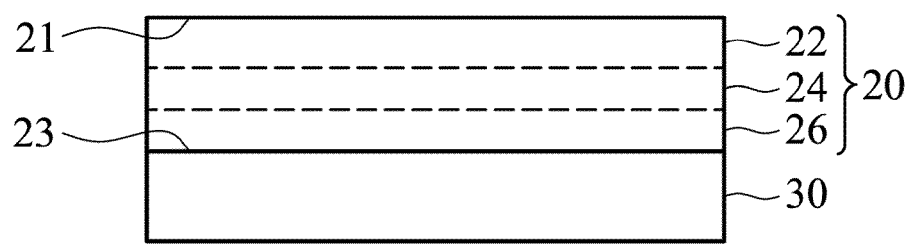
FIG. 2 shows a cross section of a conventional single-layer cholesteric liquid crystal film.
Figure 3:
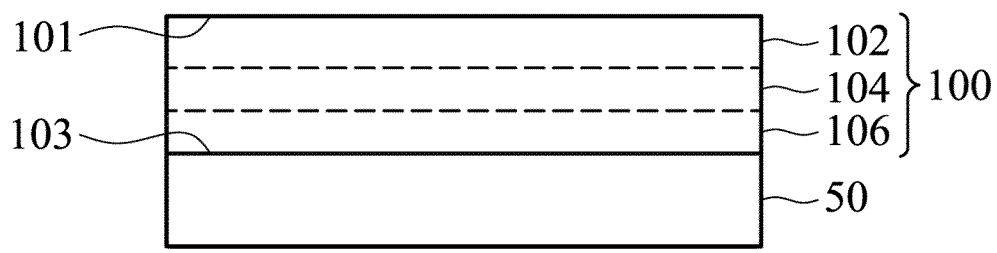
FIG. 3 shows a cross section of a broadband cholesteric liquid crystal film according to an embodiment of the invention.

The broadband cholesteric liquid crystal film of this disclosure has a selective reflection bandwidth includes most of the wavelength range of visible light. Further, the said reflection bandwidth is larger than 150 nm, such as 150-350 nm. In FIG. 3, wherein the cholesteric liquid crystal film 100 has a top surface 101 and a bottom surface 103, and the bottom surface 103 contacts with a substrate 50. The cholesteric liquid crystal film 100 consists of a first region 102, a second region 104, and a third region 106, wherein the first region 102 is adjacent to the top surface 101 of the cholesteric liquid crystal film 100, the third region 106 is adjacent to the bottom surface 103 of the cholesteric liquid crystal film 100, and the second region 104 is in between the first region 102 and the third region 106. It should be noted that the first region 102, the second region 104, and the third region 106 of the cholesteric liquid crystal film 100 have different average helical pitches. The first region 102 had an average helical pitch P1, the second region had an average helical pitch P2, and the third region had an average helical pitch P3. Particularly, the average helical pitch P1 of the first region 102 and the average helical pitch P3 of the third region 106 are both larger than the average helical pitch P2 of the second region 104. In an embodiment of this disclosure, the average helical pitch P1 of the first region, the average helical pitch P2 of the second region, and the average helical pitch P3 of the third region are defined by the following equation: P1>P3>P2. Namely, the cholesteric liquid crystal film 100 achieves an approximately symmetrical helical pitch distribution from the top surface 101 to the center and from the bottom surface 103 to the center of the cholesteric liquid crystal film 100.

According to another embodiment of the disclosure, a part of the broadband cholesteric liquid crystal film adjacent to the top surface has a helical pitch P4, a part of the broadband cholesteric liquid crystal film adjacent to the bottom surface has a helical pitch P5, and a part of the broadband cholesteric liquid crystal film having the shortest helical pitch P6 is located in the second region, wherein the broadband cholesteric liquid crystal film has a first helical pitch gradient, which generally reduces from the helical pitch P4 to the shortest helical pitch P6, and a second helical pitch gradient, which generally increases from the shortest helical pitch P6 to the helical pitch P5. Further, in an embodiment of the disclosure, the distance D1 between the top surface and the part of the broadband cholesteric liquid crystal film having the shortest helical pitch P6 can be equal to the distance D2 between the bottom surface and the part of the broadband cholesteric liquid crystal film having the shortest helical pitch P6. Moreover, in another embodiment of the disclosure, the distance D1 between the top surface and the part of the broadband cholesteric liquid crystal film having the shortest helical pitch P6 can be different from the distance D2 between the bottom surface and the part of the broadband cholesteric liquid crystal film having the shortest helical pitch P6.

Further, the thickness of the broadband cholesteric liquid crystal film is T, the thickness of the first region is 0.4T-0.5T, the thickness of the second region is 0.2T-0.3T, and the thickness of the third region is 0.2T-0.3T.

The method for fabricating a broadband cholesteric liquid crystal film of this disclosure includes step (A)-(D).

In step (A), a polymerizable cholesteric liquid crystal composition and a photoinitiator are dissolved in a solvent to prepare a solution for coating. In step (B), the solution is coated onto a substrate (such as a pre-treated alignment substrate), and a CLC coating layer is obtained. In step (C), the CLC coating layer is heated in a first atmosphere containing a first pre-fixed oxygen concentration, wherein the first pre-fixed oxygen concentration is a fixed value of between 10-30 vol %, preferably 15-25 vol %. In step (D), the heated CLC layer is cured in a second atmosphere containing a second pre-fixed oxygen concentration, obtaining the aforementioned broadband cholesteric liquid crystal film, wherein the second pre-fixed oxygen concentration is a fixed value of between 0.01-10 vol %.

In the method for fabricating the broadband cholesteric liquid crystal film of this disclosure, the polymerizable cholesteric liquid crystal composition is not limited and can be convenient polymerizable cholesteric liquid crystal composition (including the composition made of nematic liquid crystal and chiral compound). The solvent can be conventional single- or co-solvent for dissolving polymerizable cholesteric liquid crystal composition mentioned above, such as toluene, cyclopentanone, dimethylbenzene, cyclohexanone, propylene glycol methyl ether acetate (PGMEA), acetone, 2-butanone, ester, or combinations thereof. The substrate is not limited and can be, for example, a glass or a plastic substrate applied with an alignment treatment, wherein the alignment treatment includes forming an alignment film on the substrate or rubbing directly on these substrate. Further, the CLC coating layer can be cured by irradiation by UV radiation or heat. The second oxygen concentration of the second atmosphere is a fixed value, for example, of between 0.01-10 vol %. In an embodiment, the second oxygen concentration of the second atmosphere can be a fixed value of between 2-8 vol %. It should be noted that the reflection bandwidth of the broadband cholesteric liquid crystal film can be modified by the prescribed oxygen concentration of the atmosphere. Further, if the CLC coating layer is cured in the second atmosphere containing the second oxygen concentration of more than 10 vol %, the obtained cholesteric liquid crystal film would exhibit unstable and undesired film characteristics.

A method for fabricating a broadband cholesteric liquid crystal film includes the steps of (A)-(D): (A) a polymerizable cholesteric liquid crystal composition and a photoinitiator are dissolved in a solvent to prepare a solution for coating; (B) the solution is coated onto a substrate (such as a pre-treated alignment substrate), and a CLC coating layer is obtained; (C) the CLC coating layer is heated in a first atmosphere containing a first pre-fixed oxygen concentration, wherein the first pre-fixed oxygen concentration is a fixed value of between 10-30 vol %, preferably 15-25 vol %; and (D) the heated CLC layer is cured in a second atmosphere containing a second pre-fixed oxygen concentration, obtaining the aforementioned broadband cholesteric liquid crystal film, wherein the second pre-fixed oxygen concentration is a fixed value of between 0.01-10 vol %. Accordingly, in comparison with the conventional fabricating method with long-term low-energy exposure or two-stage polymerization, the method for fabricating the broadband cholesteric liquid crystal film of this disclosure has advantages of higher throughput, stable film characteristics, and reduced equipment requirements.

The following examples are intended to illustrate the disclosure more fully without limiting the scope of the disclosure, since numerous modifications and variations will be apparent to those skilled in this art.

Example 1

2.829 g of a polymerizable nematic liquid crystal (sold and manufactured by BASF with the trade name of LC-1057) was mixed with 0.171 g of a dextrorotatory chiral compound (sold and manufactured by BASF with the trade name of LC-756). The mixture was dissolved by 12 g of a co-solvent (toluene:cyclopentanone=4:1), then a solution for coating is obtained. Next, the solution was spin-coated on an alignment pretreated PET substrate and then baked to remove the solvent. The CLC layer was then heated under air atmosphere (having an oxygen concentration fixed at 20 vol %) at 100-110° C. and cooled to ambient temperature. Finally, a 5-μm thick CLC film (A) was obtained by heating to 100-110° C. again and cured by irradiation by UV radiation in an atmosphere of an oxygen concentration fixed at 5 vol % (mixed with nitrogen). The reflection bandwidth of the broadband cholesteric liquid crystal film (A) was measured, and the range of the reflection bandwidth was between 445-690 nm.

Figure 4:
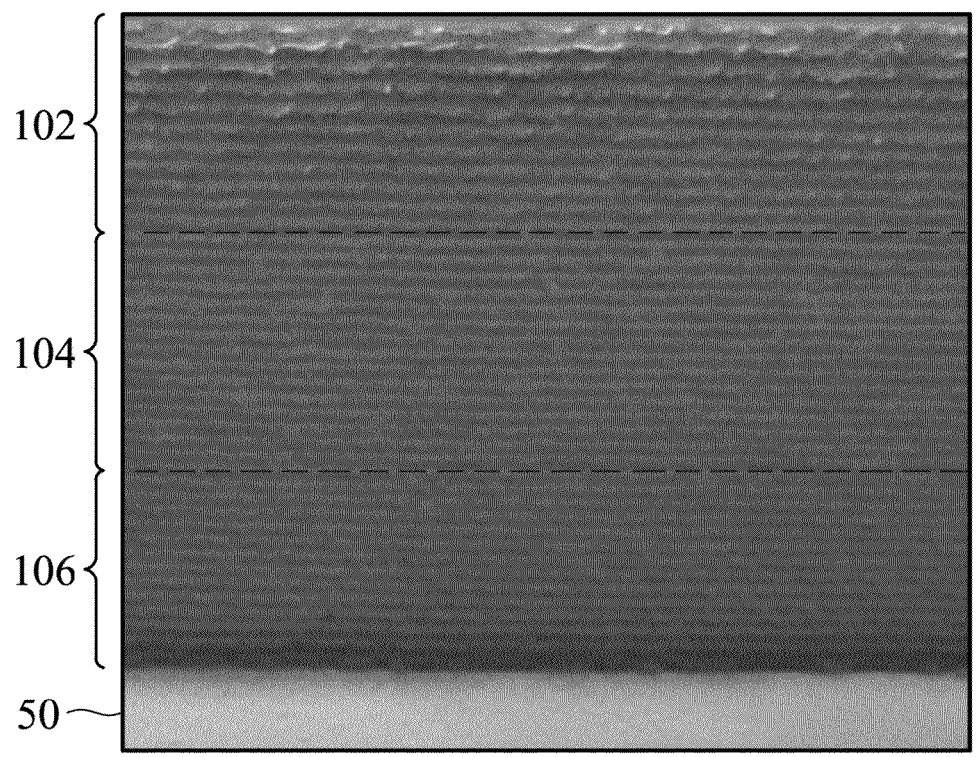
FIG. 4 shows a scanning electron microscope (SEM) photograph of the broadband cholesteric liquid crystal film (A) of Example 1.

FIG. 4 shows a scanning electron microscope (SEM) photograph of the broadband cholesteric liquid crystal film (A) derived into three regions according to the helical pitch. After measuring, the first region 102 (such as the central portion of the first region) has an average helical pitch P1 of about 368 nm, the second region 104 such as the central portion of the second region) has an average helical pitch P2 of about 275 nm, and the third region 106 (such as the central portion of the third region) has an average helical pitch P3 of about 350 nm. Therefore, the average helical pitch P1 of the first region 102, the average helical pitch P2 of the second region 104, and the average helical pitch P3 of the third region 106 are defined by the following equation: P1>P3>P2.

Example 2

The same CLC solution was spin-coated on a PET substrate of alignment pre-treated. then baked to remove the solvent. The CLC layer was then heated under air atmosphere (having an oxygen concentration fixed at 20 vol %) at 100-110° C. and cooled to ambient temperature. Finally, a 6-μm thick CLC film (A) was obtained by heating to 100-110° C. again and cured by irradiation by UV radiation in an atmosphere of an oxygen concentration fixed at 6 vol % (mixed with nitrogen), obtaining a broadband cholesteric liquid crystal film (B). Finally, the reflection bandwidth of the broadband cholesteric liquid crystal film (B) was measured, and the range of the reflection bandwidth was between 420-700 nm.

Polarization Device

Figure 5:
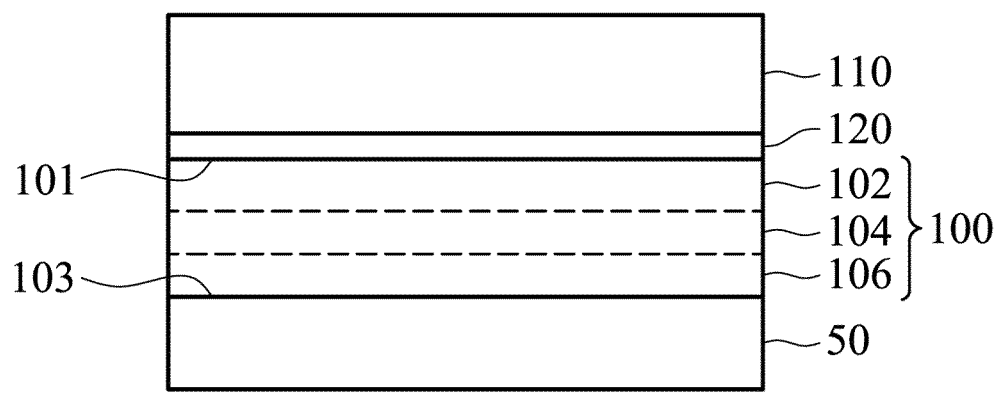
FIG. 5 shows a cross section of a Polarization device according to an embodiment of the invention.

According to an embodiment, referring to FIG. 5, we also provides a polarization device 200 including a broadband cholesteric liquid crystal film 100 (disposed on a substrate 50) and a retardation film (Z-plate, Teijin Chemical) 110, wherein the retardation film 110 is disposed on the cholesteric liquid crystal film 100. The retardation film have an in-plane retardation ($R_o$) is 138 nm (measured at wavelength 550 nm) and its out-of-plane retardation ($R_{th}$) is about 240 nm (measured at wavelength 550 nm), wherein the ratio $|(R_{th}/R_o)|$ between the out-of-plane retardation and the in-plane retardation is about 1.74.

The polarization device 200 can further include an adhesive layer 120 disposed between the retardation film and the broadband cholesteric liquid crystal film, wherein the adhesive layer 120 can have a refractivity of between 1.45-1.75 in order to reduce optical negative effects of the polarization device.

The adhesive layer 120 can be, for example, an ultraviolet curable adhesive, and can further include 0.01-10 wt % of filler (such as 0.01-6 wt % of filler). The filler can include polymethyl methacrylate (PMMA), polystyrene (PS), or silicon oxide. The filler can have a diameter of between 3-10 μm causing Mie scattering.

According to another embodiment, in order to obtain a high light efficiency polarization device, an absorbing polarizer film can be further disposed on the retardation film 110 of the polarization device 200 as shown in FIG. 5.

Liquid Crystal Display

According to some embodiments, this disclosure also provides a high light efficiency liquid crystal display including a top substrate and a bottom substrate. A first electrode formed on a bottom surface of the top substrate, and a second electrode formed on the top surface of the bottom substrate, wherein a liquid crystal cell is sandwiched between the top substrate and the bottom substrate. The aforementioned broadband cholesteric liquid crystal film is disposed inside or outside of the liquid crystal cell. Further, the liquid crystal display can further include a retardation film disposed on the broadband cholesteric liquid crystal film. A first polarizer film and a second polarizer film can be respectively disposed on the top surface and the bottom surface of the liquid crystal cell, wherein the broadband cholesteric liquid crystal film is disposed outside of the liquid crystal cell. Moreover, the liquid crystal display can further include a backlight module.

Accordingly, the broadband cholesteric liquid crystal film of this disclosure is a single-layer film, thereby eliminating complicated manufacturing processes and coating defects caused when forming a multilayer cholesteric liquid crystal film. In comparison with conventional single-layer cholesteric liquid crystal films, since the cholesteric liquid crystal film of this disclosure includes three regions with different helical pitches while maintaining a predetermined helical pitch distribution, the cholesteric liquid crystal film of the disclosure has a broader reflection bandwidth. Further, due to the one-step polymerization method, the method for fabricating the broadband cholesteric liquid crystal film of the disclosure has advantages of higher throughput, stable film characteristics, and reduced equipment requirements.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A broadband cholesteric liquid crystal film, which is a single-layer liquid crystal material structure and has a top surface and a bottom surface, wherein the broadband cholesteric liquid crystal film consists of a first region, a second region, and a third region, and the first region is adjacent to the top surface of the cholesteric liquid crystal film, the third region is adjacent to the bottom surface of the cholesteric liquid crystal film, and the second region is located between the first and third regions, and the average helical pitch P1 of the first region and the average helical pitch P3 of the third region are both larger than the average helical pitch P2 of the second region.

2. The broadband cholesteric liquid crystal film as claimed in claim 1, wherein, a part of the broadband cholesteric liquid crystal film adjacent to the top surface has a helical pitch P4, a part of the broadband cholesteric liquid crystal film adjacent to the bottom surface has a helical pitch P5, and a part of the broadband cholesteric liquid crystal film having the shortest helical pitch P6 is located in the second region, wherein the broadband cholesteric liquid crystal film has a first helical pitch gradient, which generally reduces from the helical pitch P4 to the shortest helical pitch P6, and a second helical pitch gradient, which generally increases from the shortest helical pitch P6 to the helical pitch P5.

3. The broadband cholesteric liquid crystal film as claimed in claim 2, wherein a distance D1 between the top surface and the part of the broadband cholesteric liquid crystal film having the shortest helical pitch P6 is equal to or different from a distance D2 between the bottom surface and the part of the broadband cholesteric liquid crystal film having the shortest helical pitch P6.

4. The broadband cholesteric liquid crystal film as claimed in claim 1, wherein the average helical pitch P1 of the first region, the average helical pitch P2 of the second region, and the average helical pitch P3 of the third region are defined by the following equation: P1>P3>P2.

5. The broadband cholesteric liquid crystal film as claimed in claim 1, wherein the broadband cholesteric liquid crystal film has a reflection bandwidth within the wavelength range of visible light, and the reflection bandwidth of the broadband cholesteric liquid crystal film is of more than 150 nm.

6. The broadband cholesteric liquid crystal film as claimed in claim 1, wherein the thickness of the broadband cholesteric liquid crystal film is T, the thickness of the first region is 0.4T-0.5T, the thickness of the second region is 0.2T-0.3T, and the thickness of the third region is 0.2T-0.3T.

7. A polarization device, comprising:
the broadband cholesteric liquid crystal film as claimed in claim 1; and
a retardation film disposed on the broadband cholesteric liquid crystal film.

8. The polarization device as claimed in claim 7, wherein the retardation film has an in-plane retardation value (Ro) substantially one-quarter of the wavelength of visible light, and an out-of-plane retardation (Rth), wherein the ratio |(Rth/Ro)| is between 0.5-3.

9. The polarization device as claimed in claim 7, further comprising:
an adhesive layer disposed between the retardation film and the broadband cholesteric liquid crystal film, wherein the adhesive layer has a refractivity of between 1.45-1.75.

10. The polarization device as claimed in claim 9, wherein the adhesive layer is made of an ultraviolet light curable adhesive.

11. The polarization device as claimed in claim 9, wherein the adhesive layer further comprises 0.01-10 wt % of a filler, and the filler has a diameter of between 3-10 μm.

12. The polarization device as claimed in claim 7, further comprising:
an absorbing polarizer film disposed on the retardation film.

13. A high light efficiency liquid crystal display, comprising:
- a top substrate and a bottom substrate;
- a first electrode formed on a bottom surface of the top substrate, and a second electrode formed on the top surface of the bottom substrate, wherein a liquid crystal cell is thereby defined between the top substrate and the bottom substrate; and
- the broadband cholesteric liquid crystal film as claimed in claim 1 disposed inside or outside of the liquid crystal cell.

14. The high light efficiency liquid crystal display as claimed in claim 13, further comprising:
- a retardation film disposed on the broadband cholesteric liquid crystal film.

15. The high light efficiency liquid crystal display as claimed in claim 13, further comprising:
- a first polarizer film and a second polarizer film respectively disposed on a top surface and a bottom surface of the liquid crystal cell, wherein the broadband cholesteric liquid crystal film is disposed outside of the liquid crystal cell.

16. The high light efficiency liquid crystal display as claimed in claim 13, further comprising:
- a backlight module.

* * * * *